United States Patent
Hutchins

[15] 3,704,449
[45] Nov. 28, 1972

[54] APPARATUS FOR MEASURING AND INDICATING THE ANGULAR POSITION OF AN ANTENNA

[72] Inventor: Samuel F. Hutchins, 1744 Rosalind Dr. N.E., Atlanta, Ga. 30329

[22] Filed: Aug. 17, 1970

[21] Appl. No.: 64,605

Related U.S. Application Data

[63] Continuation of Ser. No. 649,537, June 28, 1967, abandoned.

[52] U.S. Cl. .............340/198, 343/100 AP, 74/410, 74/409, 325/67
[51] Int. Cl. ........................F16h 57/00, G08c 19/00
[58] Field of Search ................340/198, 315; 325/67; 324/158 SY; 74/410, 409, 421 R; 343/100 AP; 318/12, 15, 595, 630

[56] References Cited

UNITED STATES PATENTS

| | | | |
|---|---|---|---|
| 3,034,053 | 5/1962 | Lanning et al. | 340/198 |
| 2,995,046 | 8/1961 | Mansachs | 74/410 |
| 3,396,594 | 8/1968 | Walker | 74/409 |
| 3,338,109 | 8/1967 | Forsyth et al. | 74/410 |
| 2,614,237 | 10/1952 | Goertz | 340/198 |
| 3,274,597 | 9/1966 | Archer | 343/100 AP |
| 2,940,074 | 6/1960 | Watt | 343/100 AP |
| 2,701,876 | 2/1955 | Mottley et al. | 343/100 AP |
| 3,174,351 | 3/1965 | Spencer | 74/409 |
| 3,397,590 | 8/1968 | Prentice | 74/409 |
| 3,167,967 | 2/1965 | Silberger | 74/421 R |
| 3,513,715 | 5/1970 | Whitfield | 74/410 |
| 1,696,740 | 12/1928 | Treschow | 74/410 |

FOREIGN PATENTS OR APPLICATIONS

| | | | |
|---|---|---|---|
| 562,158 | 5/1923 | France | 74/410 |
| 879,255 | 2/1943 | France | 74/410 |

Primary Examiner—John W. Caldwell
Assistant Examiner—Robert J. Mooney
Attorney—Cushman, Darby & Cushman

[57] ABSTRACT

An antenna position measuring and indicating system is disclosed wherein the angular position of the antenna is mechanically amplified by a special gear arrangement in order to increase the resolution of the angular indication and to decrease the electrical error of a synchro transmitter. The synchro converts the amplified mechanical indication to an electrical position signal which is transmitted to position indicating apparatus.

The gear arrangement steps up or amplifies the angular position of the antenna — that is, for each revolution of the shaft connected to the antenna, the shaft connected to the synchro transmitter undergoes a plurality of revolutions. A first gear is attached to the shaft connected to the antenna and another gear is attached to the shaft connected to the synchro. Two intermediate shafts with gears at both ends of each shaft are also provided. The last-mentioned gears mesh with opposite sides of the gears associated with the antenna and synchro. Thus, any eccentricity of the gear associated with the antenna is averaged out so that the angular position of the shaft connected to the synchro is an accurate amplification of the true angular position of the shaft connected to the antenna. Hence, the combined mechanical error (due to the gear arrangement) and electrical error (due to the synchro) is substantially minimized.

6 Claims, 4 Drawing Figures

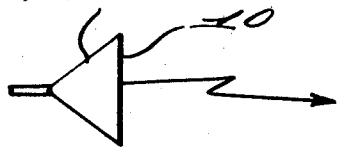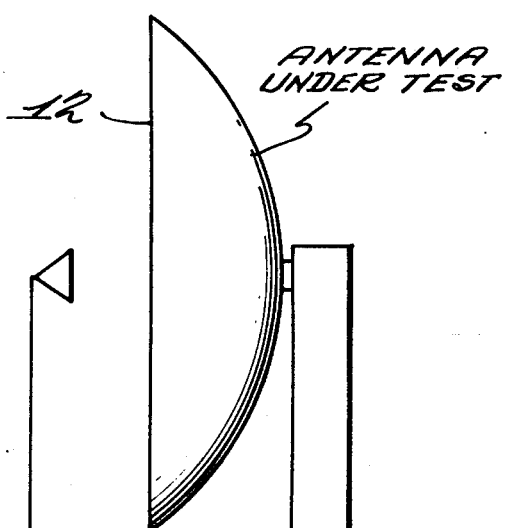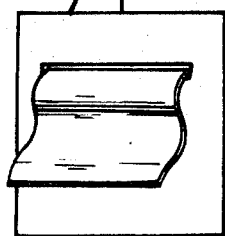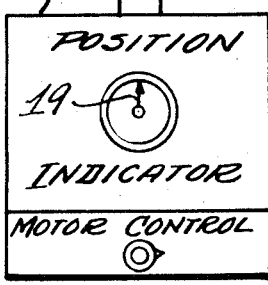

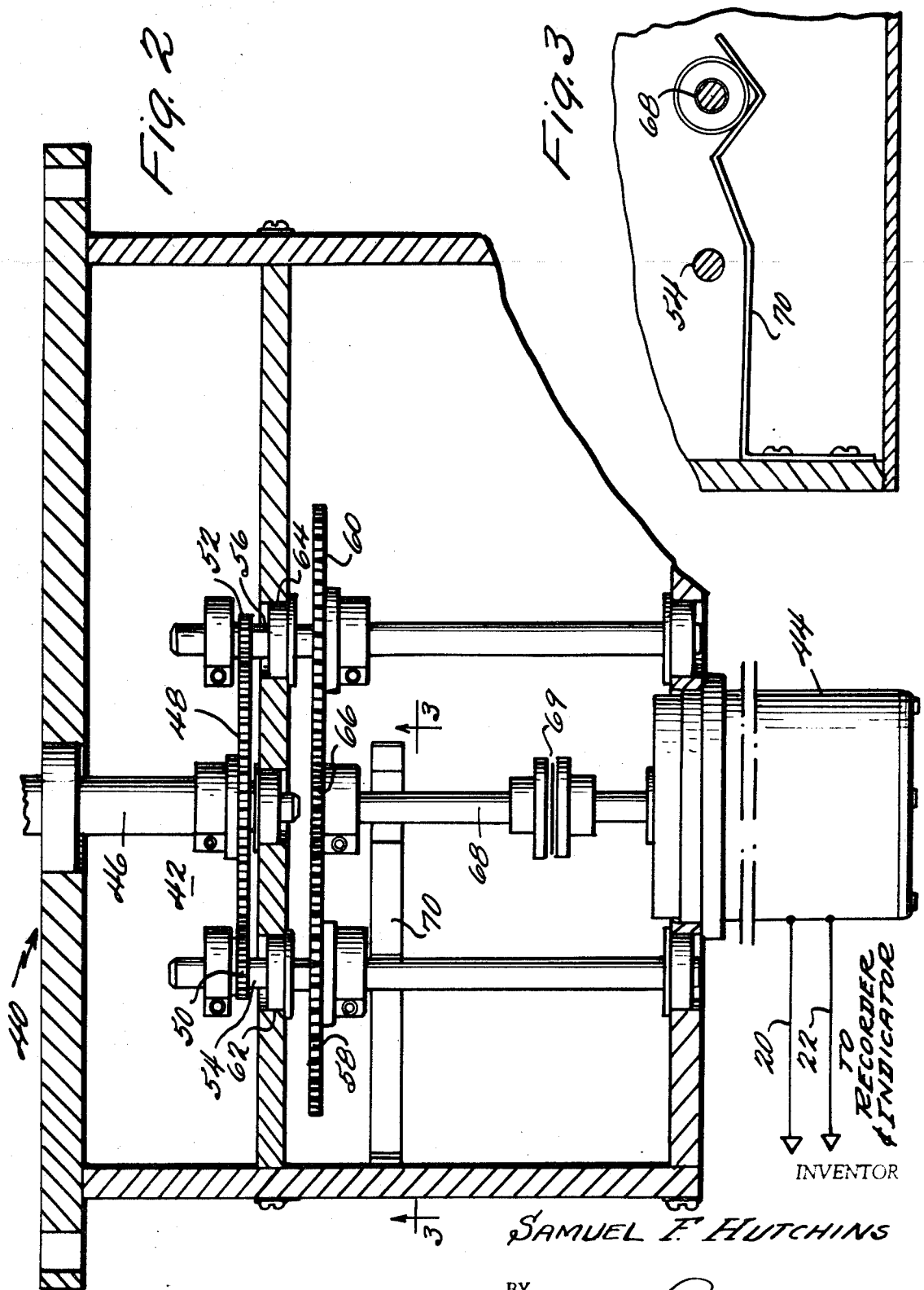

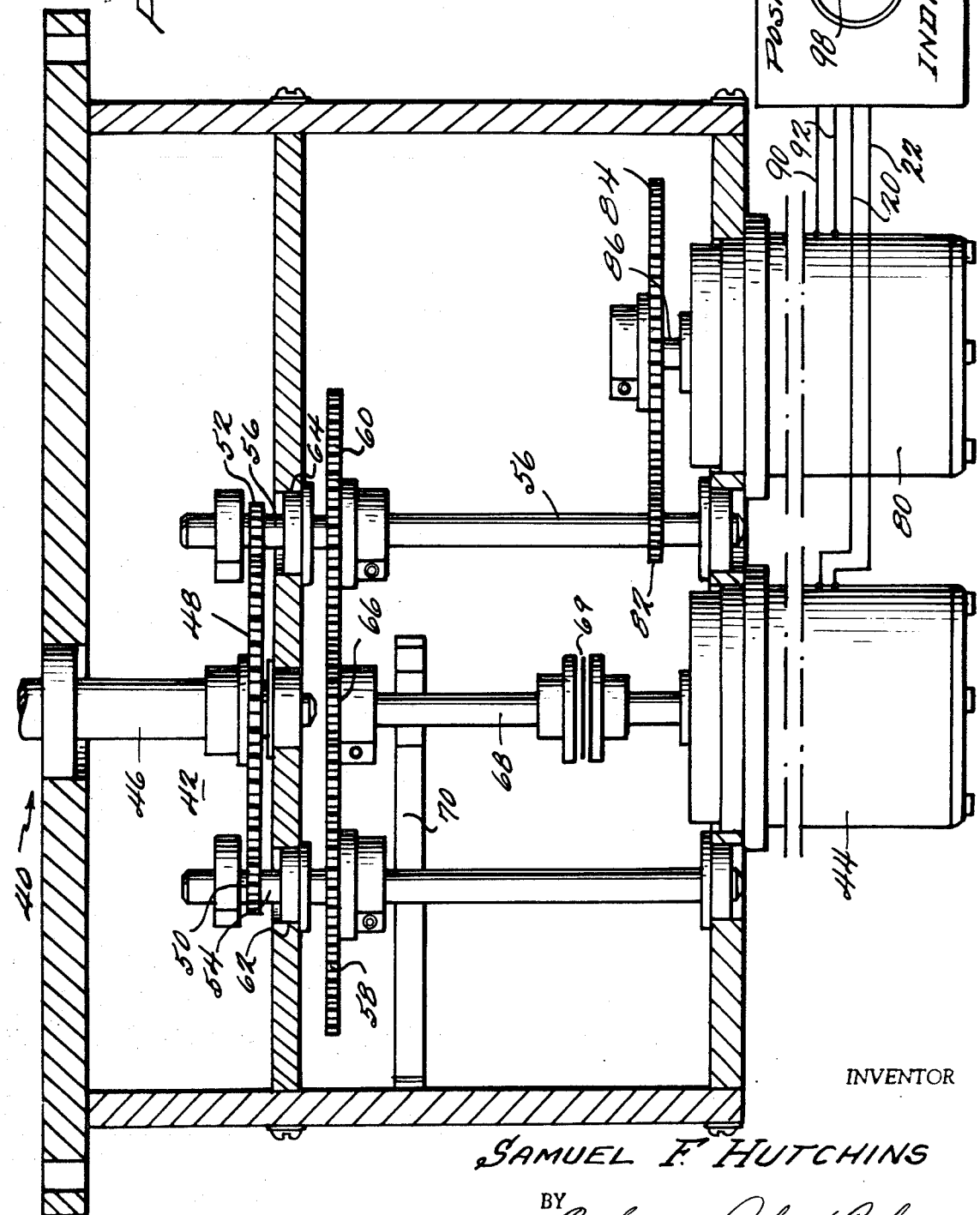

3,704,449

APPARATUS FOR MEASURING AND INDICATING THE ANGULAR POSITION OF AN ANTENNA

This is a continuation of U.S. application Ser. No. 649,537, filed June 28, 1967, now abandoned.

BACKGROUND OF THE INVENTION

This invention relates to antenna position measuring and indicating systems and in particular to antenna position indicating systems where the position indication is amplified for increased resolution.

Typically, in such systems, the mechanical indication of the antenna position is converted to an electrical position signal which is transmitted to remotely located position indicating and recording equipment. This conversion is performed by a synchro transmitter, which introduces an inherent electrical error into the measurement. When the accuracy of the measurement must be greater than that obtainable from the unaided synchro, step-up gearing may be employed between the antenna and the synchro so that for each revolution of the antenna, the shaft input to the synchro undergoes a plurality of revolutions, thereby accordingly reducing the electrical error introduced by the synchro. However, the step-up gearing introduces a mechanical error which must be dealt with. By using the special step-up gearing described in the specification, the combined mechanical and electrical errors can be reduced to a value substantially less than that obtainable from an uncorrected, unaided synchro.

PRIOR ART

The special gearing arrangement employed in this invention has been employed in other applications as evidenced by the patents to Farnum, U.S. Pat. No. 1,383,705; Treschow, U.S. Pat. No. 1,696,740; and Mansachs, U.S. Pat. No. 2,995,046. In each of these patents, the special gearing arrangement is employed as a power transmission device to equalize loads on the gear teeth and thus equalize wear. However, in the present invention, it is recognized that such gear systems also equalize variations in angular rotation, as will be brought out in the detailed description of an embodiment of the invention.

SUMMARY

Thus, it is an object of this invention to provide an improved antenna position measuring and indicating system.

It is another object of this invention to provide in such a system, a geared synchro transmitter where the combined mechanical error (due to the gearing) and electrical error (due to the synchro) is less than that obtainable from the synchro alone.

It is a further object of this invention to provide in such a position measuring system, a gearing arrangement such that the eccentricity of the gears is compensated thereby insuring high accuracy of the measurement.

It is a further object of this invention to provide an improved geared synchro transmitter from which "coarse" and/or "fine" outputs are available.

It is a further object of this invention to provide anti-backlash means in the before mentioned special gearing arrangement.

Other objects and advantages of the invention will become apparent upon reading the appended claims in conjunction with the following detailed description and the attached drawings.

BRIEF DESCRIPTION OF THE DRAWING

FIG. 1 is an illustrative system in which the improved antenna position measuring and indicating system of this invention may be employed;

FIG. 2 is an illustrative embodiment of the improved antenna position measuring and indicating system of this invention;

FIG. 3 is a sectional view taken along line 3—3 of FIG. 2; and

FIG. 4 is an illustrative, further embodiment of the invention.

Referring to FIG. 1, there is shown a typical antenna system in which the improved antenna position measuring and indicating arrangement of this invention is employed. In particular, the antenna system of FIG. 1 may be used for measuring the pattern of antenna 12. Antenna 10 directs radiation to antenna 12, the angular position of which is continuously varied to obtain the desired pattern measurement. As antenna 12 is rotated, the amplitude of the output signal therefrom varies in accordance with the pattern variation thereof. The output signal from antenna 10 is applied to a conventional pattern recorder 14, which plots the signal amplitude as a function of angular position. Position information is applied to recorder 14 and position indicator 16 from positioner 18 over lines 20 and 22.

The antenna positioner 18 includes a turntable 24 which is seated on a large diameter bearing 26 and is rotated by a ring gear 28 that is engaged to a pinion 30, which, in turn, is driven by motor 32 through gear arrangement 35. Thus, motor 32 causes the rotation of antenna 12 which is mounted on turntable 24. Control signals for motor 32 are provided from motor control means 34 over line 36.

Positioner 18 also includes synchro assembly 40 with a high accuracy, anti-backlash, gear arrangement, which will be described in more detail hereinafter with respect to FIG. 2. Assembly 40 measures the mechanical angular position of antenna 12 with respect to antenna 10 and converts the mechanical measurement to the electrical position signal which is transmitted over lines 20 and 22. The turntable 24 is connected to assembly 40 by coupling means 41, which acts as a universal joint.

Synchro assembly 40 is shown in more detail in FIG. 2 and includes the high accuracy, anti-backlash, gear arrangement 42 and synchro transmitter 44, which typically has an electrical error of 0.1°, although synchros having an error of less than 3 arc minutes are preferably employed in an antenna positioning system.

Because of the above electrical error, the signal transmitted by synchro 44 is not satisfactory in systems where the angular position must be measured to an accuracy greater than that available from the synchro. Hence, gear arrangement 42 is employed to reduce the synchro error and increase resolution. Typically, the synchro is geared 36:1, thereby reducing the electrical error by a factor of 36. Thus, if the synchro error were 0.1°, the positioner error would be reduced to 0.00288°. However, the gearing-up to 36:1 introduces a mechanical error of about 0.03° and, thus, the combined electrical and mechanical error would be more than 0.03°. It is an important object of this invention to use the gear arrangement 42 so that the combined electrical and mechanical error is less than 0.01°, assuming that synchros with less than 3 minutes electrical error are employed.

The eccentricity or inevitable dimensional errors of the input gears for standard synchros brings about the mechanical angular positioning errors. Although dimensional errors are inevitable in the manufacture of gears, the effects of the errors are averaged out by the gear arrangement 42. Although the beforementioned patents to Mansachs, U.S. Pat. No. 2,995,046; Farnum, U.S. Pat. No. 1,383,705; and Treschow, U.S. Pat. No. 1,696,740, each discloses a gear arrangement similar to arrangement 42, none of the patents discloses such gear arrangements that equalize variations in angular rotations. Rather, these patents teach the use of such gear arrangements as power transmission devices where the loads on the teeth are equalized thereby equalizing wear.

Gear arrangement 42 is connected to shaft 46, which, in turn, is connected to coupling means 41 of FIG. 1. Attached to shaft 46 is first gear means 48. Second and third gear means 50 and 52 mesh on opposite sides of first gear means 48 and are connected to shafts 54 and 56, respectively, gears 50 and 52 preferably being of equal size. Also connected to shafts 54 and 56 are fourth and fifth gear means 58 and 60, respectively. Bearings 62 and 64 are respectively provided for shafts 54 and 56. Sixth gear means 66 meshes with gears 58 and 60 and is connected to shaft 68, which, in turn, is connected to flexible coupling means 69. The operation of the gear arrangement 42 is as follows. The rotation of gear 48 causes the rotation of gears 50 and 52. The rotation of gears 50 and 52, in turn, causes the rotation of gears 58 and 60, which, in turn, rotate gear 66.

Coupling means 69 accommodates any vertical movement of gear 66 or movement in a direction perpendicular to a line connecting the centers of gears 58 and 60. Thus, the error in angular output is minimized whenever gear eccentricity occurs. Thus, this results in less gear error between the true position of the input shaft 46 and the output of synchro 44.

For example, if gear 48 is eccentric and rotating at a constant angular rate, gear 50 will rotate faster than normal during part of the rotation of gear 48 and slower than normal during another part of the rotation of gear 48. However, since gear 52 is on the opposite side of gear 48, gear 52 rotates faster than normal at the same time that gear 50 rotates slower than normal. Gears 58 and 60 also rotate faster and slower than normal at the same time. However, since gear 66 is meshed with both gears 58 and 60, the rotational rate of gear 66 tends to have an average value which is the correct rate. As a result of the above-described motion, gear 66 tends to move vertically upward and downward. This upward and downward movement is readily accommodated with no significant error by coupling means 69.

As indicated in FIGS. 2 and 3, spring 70 is associated with shaft 68 to keep the teeth of gear 66 always meshed with teeth of gears 58 and 60 so that there is no backlash between either gear 58 and gear 66 or gear 60 and gear 66. Further, because of the tension of spring 70, no backlash exists between gears 48 and 50 and between gears 48 and 52.

The operation of the system will now be described. Assuming a 36:1 geared synchro arrangement is employed, the radiation pattern measurement of antenna 12 proceeds as follows. The turntable 24 is caused to rotate by the application of a suitable control signal over line 36 to motor 32. As antenna 12 rotates, the amplitude of the output signal from antenna varies in accordance with the pattern variation of antenna 12, this output signal being applied to recorder 14 over line 13. In order to corelate the angular position of antenna 12 with the output signal therefrom, position information is applied over lines 20 and 22 to recorder 14. This information is also applied to position indicator 16.

In order to increase the resolution of the angular position measured a geared synchro assembly 40 is provided, the mechanical angular position of shaft 46 being amplified by a factor 36 by gear assembly 42 and applied to synchro transmitter 44, which generates an electrical position signal corresponding to the stepped-up mechanical angular position. The electrical position signal is applied over lines 20 and 22 to recorder 14 and indicator 16, both of which include closed loop servo systems (not shown) with synchros and motors for driving or actuating them.

Thus, the advantages of a gear arrangement such as arrangement 28, in a system for accurately measuring the angular position of an antenna, can now be seen. Because of the parallel intermediate shafts 54 and 56, the mechanical error due to eccentricity of gear 48 is averaged out. Further, eccentricity errors of the gears 50, 52, 58 and 60 on shafts 54 and 56 may be partially averaged by putting the high and low portions or "-spots" on the right side in phase with the high and low portions or "spots" on the left side.

Referring to FIG. 4, there is shown a further embodiment of the invention wherein common reference numerals in FIGS. 2 and 4 are intended to refer to the same elements. In addition to the structure already shown and described in FIG. 2 there is shown a second synchro transmitter 80 connected to shaft 56 by seventh gear means 82, eighth gear means 84, and shaft 86. The number of revolutions of gear 84 corresponds on a 1:1 basis with the number of revolutions of gear 48, gears 52 and 82 preferably being of the same size and type, as would be gears 48 and 84. Thus, for each revolution of the antenna, the shaft 84 also undergoes one revolution. Of course, the connection may also be made to shaft 54 as opposed to shaft 56.

The output signals from synchro transmitters 44 and 80 are applied over lines 20, 22 and 90, 92, respectively, to position indicator 94. Indicator 94 includes pointers 96 and 98, which are respectively responsive to synchro transmitters 44 and 80 with pointer 96 providing a "fine" indication of the antenna's angular position while pointer 98 provides a "coarse" indication. Further, in some applications, the use of coarse pointer 98 is required to clarify the indication of fine pointer 96 — that is, since pointer 96 undergoes a plurality of rotations for each rotation of the antenna, pointer 98 must indicate the approximate angular position of the antenna. Thus, the pointers 96 and 98 respectively correspond to the "long" and "short" hands of a clock, by way of analogy.

The position indicator 16 of FIG. 1 is responsive only to the "fine" position signal from synchro 44, there being means provided within indicator 16 to resolve the ambiguity discussed above with respect to pointers 96 and 98 of FIG. 4. Thus, only a single indicator 19 is provided which could be the count within a digital register. Various types of ambiguity resolving techniques are known to those of ordinary skill in this art and thus, it is considered to be within the scope of ordinary skill to provide the necessary ambiguity resolution at position indicator 16.

Referring to FIG. 4, the position signal from synchro 80 may also be applied to recorder 14, instead of the synchro 44 position signal, depending on the particular application. Of course, appropriate adjustments would be made at recorder 14 if it were switched from synchro 44 to synchro 80 to account for the less rapid variation of the output signal from synchro 80.

Thus, in summary, with respect to the embodiment of FIG. 4, it can now be seen that the gear arrangement 42 has the additional, inherent advantage of providing, not only the highly accurate, stepped-up output from synchro 44 but also the output from synchro 80, which corresponds to the approximate angular position of the antenna. This additional output is provided with a minimum of additional elements as is readily apparent from a comparison of FIGS. 2 and 4.

Still numerous other modifications of the invention will become apparent to one of ordinary skill in the art upon reading the foregoing disclosure. During such a reading, it will be evident that this invention has provided a unique system for accomplishing the objects and advantages, and even further modifications will be apparent from this disclosure. It is to be understood, however, that the foregoing disclosure is to be considered exemplary and not limitative, the scope of the invention being defined by the following claims.

I claim:

1. An antenna positioning indicating system comprising:

an antenna means mounting said antenna for rotation a first gear operatively connected to said antenna mounting means, the angle of rotation of said first gear exactly corresponding to the angle of rotation of said antenna, a second gear meshed with said first gear, a first shaft mounted for rotation in fixed position with respect to said first gear, said second gear being mounted on said first shaft for rotation with it, a third gear also meshed with said first gear at a position diametrically opposite said second gear, a second shaft mounted for rotation in fixed position with respect to said first gear, said third gear being mounted on said second shaft for rotation with it, fourth and fifth gears mounted respectively on said first and second shafts for rotation with them and with said second and third gears respectively, a sixth gear meshed respectively with said fourth and fifth gears at diametrically opposite positions of said sixth gear, means mounting said sixth gear for rotation, indicating means operatively connected to said sixth gear to indicate the angular position of the sixth gear, the sizes of the gears being such that the angular rotation of said sixth gear means is a multiple of the angular rotation of said antenna, the said positions of said gears averaging out eccentricity errors of said gears whereby the angular position indicated for said antenna is an accurate multiple thereof.

2. A system as in claim 1, including means for converting the angular position of said sixth gear means to an electrical position signal, which is applied to said indicating means.

3. A system as in claim 2 where said amplification of the angular position of said antenna is by an approximate factor of 36 thereby reducing the electrical error of said signal converting means by said factor.

4. A system as in claim 2 including flexible coupling means for accommodating movement of said gear means in a direction perpendicular to its direction of rotation.

5. A system as in claim 2 where said indicating means includes means for recording said antenna position.

6. A system as in claim 1 including means for preventing backlash between (1) said fourth and sixth gear means, (2) said fifth and sixth gear means, (3) said first and second gear means, and (4) said first and third gear means.

* * * * *